United States Patent Office 3,555,704
Patented Jan. 19, 1971

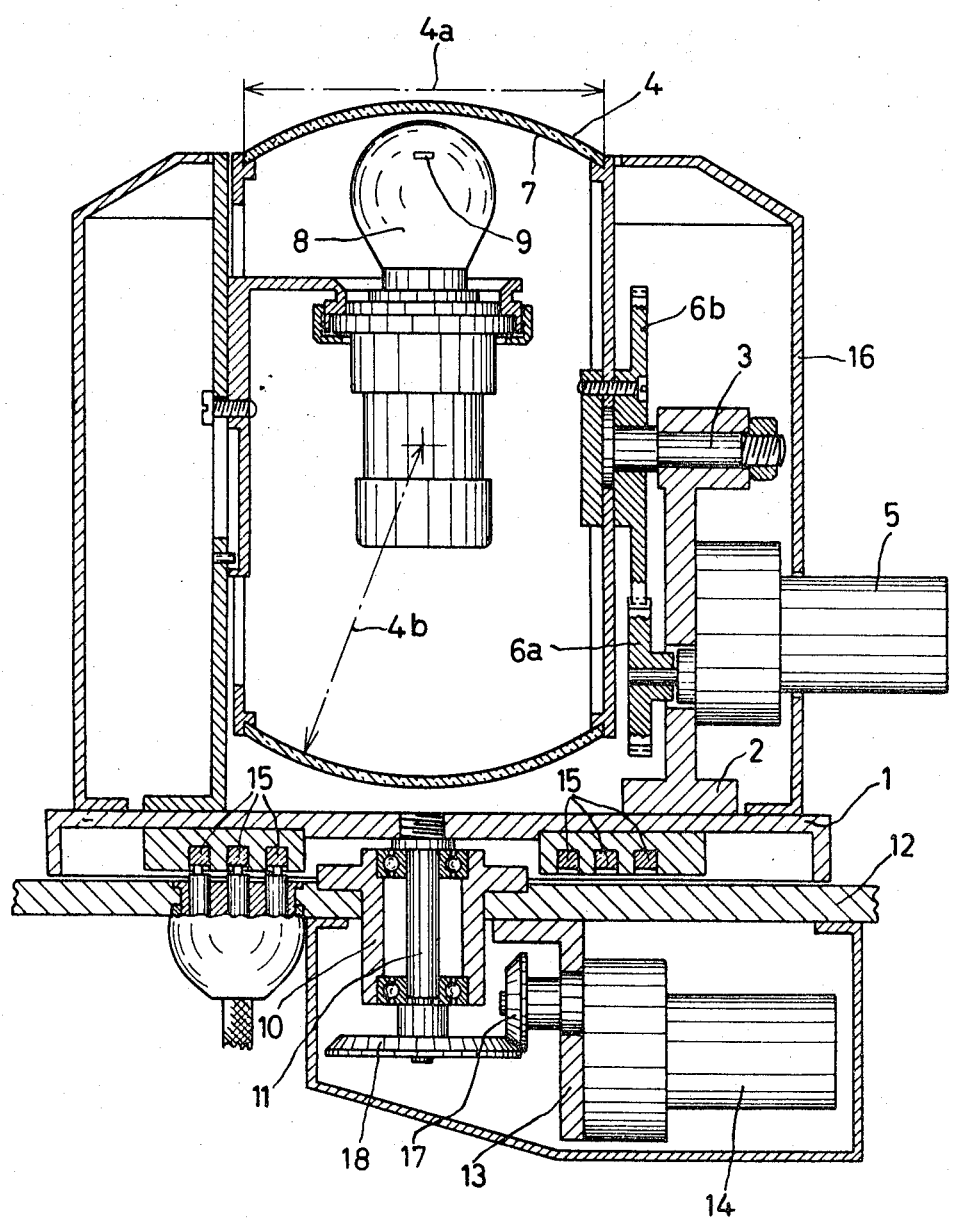

---

3,555,704
CLOUD PROJECTOR
Kurt Schrumpf, Oberkochen, and Franz Busch, Heidenheim, Germany, assignors to Carl Zeiss-Stiftung, doing business as Carl Zeiss, Heidenheim (Brenz), Wurttemberg, Germany, a German corporation
Continuation of application Ser. No. 616,232, Feb. 15, 1967. This application Jan. 29, 1970, Ser. No. 7,360
Claims priority, application Germany, Feb. 17, 1966, Z 10,434
Int. Cl. G09b 27/00
U.S. Cl. 35—42.5
3 Claims

ABSTRACT OF THE DISCLOSURE

A cloud projector is provided with transparent equatorial belt or ring carrying a picture of the clouds to be projected. This ring which forms a part of a spherical shell is rotatable about its horizontal axis and is supported by a base structure which is rotatable about a vertical axis passing through the center of said spherical shell.

---

This is a continuation of application Ser. No. 616,232 filed Feb. 15, 1967, now abandoned.

The invention relates to a projector which displays a picture of diffuse drifting clouds onto an artificial sky, such as a circular stage horizon or a projection planetarium. There the effect is desired for the observer that, as in nature, the clouds at a constant wind velocity seemingly move fastest at or near the zenith and slowest at the horizon.

According to the invention, this effect is produced with simple means in that a ring made of transparent material serves as a carrier for the cloud picture to be projected. This ring is rotatably mounted about its horizontal axis and encloses at least one small stationary source of light arranged extremely eccentrically above the axis of rotation. The annular picture carrier is so arranged that it can be easily exchanged in order to be able to project various cloud patterns.

Tests have shown that particularly favorable results are obtained with a spherical zone ring the width of which is about equal to the radius of the ball. This spherical zone ring may be about 80 mm. wide and have a wall thickness of 2.5 mm. In order to be able to adjust the device for different directions of the wind for driving the clouds, the device is mounted on a support plate which is rotatable about a vertical axis and is driven by a motor operating independently of another motor which rotates the picture carrier.

The invention will be explained in further detail with reference to the single figure of the accompanying drawing which is a vertical sectional view of the projection device according to the invention.

On a horizontal base plate 1 is mounted a base 2 made for example of cast metal which serves as a carrier for the shaft bearing 3 of the picture holder 4, the drive motor 5 and the gearing 6a–6b. The picture holder 4 rotates about a horizontal axis formed by said bearing 3 and consists of an equatorial belt or ring of uniform width forming a portion of a spherical shell whose center of curvature is disposed in the horizontal axis of the shaft bearing 3. The picture holder 4 is made of a transparent material in which, preferably on its inner face, the picture 7 to be projected is arranged by any desired method. The small cloud pictures may be painted on, imprinted or glued on in the form of elastic foils or net membranes. The picture holder 4 may also be provided with a photosensitive layer onto which a negative of the cloud picture is copied.

Extremely eccentrically above the horizontal axis of rotation of the picture holder 4 is arranged a stationary projection lamp 8 having a small incandescent coil 9. For an observer the clouds appear, when viewed in the direction of their movement, at an altitude $h$ and a speed $v$ and with an angular velocity $w$ at a point in the elevation of the viewing angle $\beta$ which is proportional to the square of sin $\beta$. This corresponds to the relation $$w = \frac{v}{h} \cdot \sin^2 \beta$$

which in reality creates the impression of a velocity of movement of the clouds decreasing from zenith toward horizon.

In the exemplary embodiment the width 4a of the equatorial ring is about equal to the radius 4b of the associated spherical shell. The base plate 1 is mounted on a support 12 by means of a ball bearing 10 in such a manner that it is rotatable about the vertical symmetrical axis of the device formed by a vertical shaft 11 fixed to the base 1. Connected to the support 12 by means of an angular bracket 13 is a drive motor 14 which by a gearing 17, 18 is connected with the shaft 11. The motor 5 with the projection lamp 8 is supplied with electric current by slip rings 15 mounted on the lower face of the base 1. All parts of the device arranged above the base 1 are protected by a hood 16 which leaves only the picture holder 4 uncovered over the angle of projection. The vertical axis of the shaft 11 passes through the center of the spherical shell from which the ring 4 is made.

What we claim is:
1. A device for the projection of moving diffuse clouds, for instance upon an artificial sky in a planetarium, comprising a stationary horizontally disposed support, a horizontal base plate above said support and rotatable about a vertical axis, means attached to the lower face of said stationary support for rotating a vertical shaft fixedly attached to and extending downwardly from said horizontal base plate so as to rotate the latter, an upright base attached to the upper face of said rotatable horizontal base plate, a bearing at the upper end of said upright base, a horizontal shaft in said bearing, a picture holder carried by said horizontal shaft and comprising a rotatable equatorial belt of transparent material and carrying a cloud picture to be projected, said equatorial belt having the form of a ring of uniform width constituting a portion of a spherical shell, the two opposite ends of said ring being formed by axially aligned circular edges of the same diameter and arranged in axially spaced parallel planes, whereby the center of curvature of said spherical shell is arranged in the center of the line connecting the centers of said circles and in the axis of said horizontal shaft in said bearing, the vertical axis of said vertical shaft extending through said center of curvature of said spherical shell, means for rotating said picture holder about the axis of said horizontal shaft, the latter being arranged such a distance from said horizontal base plate that the entire picture holder is disposed above said base plate, and means including a stationary light source having a small incandescent coil positioned eccentrically within said picture holder closely adjacent its perimeter and above the horizontal axis of rotation of said picture holder.

2. A device according to claim 1, in which the width of said ring is substantially equal to the radius of curvature of the spherical shell from which said ring is made.

3. A device according to claim 1, in which said ring has an outer spherical radius of about 80 mm. and has a wall thickness of about 2.50 mm.

References Cited

UNITED STATES PATENTS

| | | | |
|---|---|---|---|
| 1,921,570 | 8/1933 | Johnson | 40—106.53 |
| 2,168,799 | 8/1939 | Korkosz et al. | 35—42.5 |
| 2,204,435 | 6/1940 | Musaphia | 40—106.53 |
| 2,474,096 | 6/1949 | Dehmel | 35—42.5X |
| 3,119,565 | 1/1964 | Nottingham | 40—106.53X |

FOREIGN PATENTS

| | | | |
|---|---|---|---|
| 590,078 | 12/1933 | Germany | 35—42.5 |
| 707,877 | 4/1954 | Great Britain | 35—42.5 |

JEROME SCHNALL, Primary Examiner

U.S. Cl. X.R.

40—106.53; 353—46